United States Patent [19]

Nagasaki

[11] Patent Number: 5,784,271
[45] Date of Patent: Jul. 21, 1998

[54] DATA PROCESSOR FOR INTERRUPTION CONTROL BETWEEN THE CPU AND THE INTERRUPTION CONTROLLER

[75] Inventor: Kazunori Nagasaki, Tokyo, Japan

[73] Assignee: NEC Corporation, Tokyo, Japan

[21] Appl. No.: 536,844

[22] Filed: Sep. 29, 1995

[30] Foreign Application Priority Data

Sep. 30, 1994 [JP] Japan ................... 6-236548

[51] Int. Cl.$^6$ ..................... G05B 15/00
[52] U.S. Cl. .............. 364/133; 364/200; 395/200.01; 395/311; 395/386; 395/730; 395/725; 395/733; 395/738; 395/740; 395/742; 395/737; 395/734; 395/750; 395/768; 395/856
[58] Field of Search .................. 364/133, 200; 395/200.01, 725, 750, 311, 386, 730, 733, 738, 740, 742, 737, 734, 768, 856

[56] References Cited

U.S. PATENT DOCUMENTS

| | | | |
|---|---|---|---|
| 4,847,752 | 7/1989 | Akashi | 364/868 |
| 5,317,747 | 5/1994 | Mochida et al. | 395/733 |
| 5,379,435 | 1/1995 | Hanaoka | 395/750 |
| 5,481,726 | 1/1996 | Kumaki et al. | 395/200.01 |

FOREIGN PATENT DOCUMENTS 63-126035  5/1988  Japan.

*Primary Examiner*—Reba I. Elmore
*Assistant Examiner*—McDieunel Marc
*Attorney, Agent, or Firm*—Foley & Lardner

[57] ABSTRACT

A data processor comprises a CPU and an interruption controller connected with control signal line. The CPU changes signal level at a control signal line in response to an interruption request. The interruption controller executes the interruption control at the timing of rising or falling of the level with detecting a change of the signal level at said control signal line.

12 Claims, 3 Drawing Sheets

DATA PROCESSOR FOR INTERRUPTION CONTROL BETWEEN THE CPU AND THE INTERRUPTION CONTROLLER

BACKGROUNDS OF THE INVENTION

1. Field of the Invention

The present invention relates to a data processor used in a microcomputer, and particularly relates to a data processor for interruption control between the central processing unit (CPU) and the interruption controller.

2. Description of the Related Art

A data processor of this kind for interruption control between the CPU and the interruption controller is usually provided with several control signal lines connecting the CPU and the interruption controller.

FIG. 3 is a block diagram which shows the configuration of a conventionally used, typical data processor.

In the data processor shown in the figure, instructions are executed under the control of a microprogram, which is a kind of software. The microprogram is at the memory space called a micro ROM (not shown) in a CPU 300. Various control signals are generated by execution of the microprogram.

Specifically, the instruction codes read from an internal ROM are stored in the instruction queue (not shown) in the CPU 300. The output from the instruction queue specifies a certain address and the data for it in the micro ROM. When the specified data is active, the control signal corresponding to that data is controlled to be "1". Similarly, control signals from the CPU 300 to an interruption controller 400 are generated according to the microprogram.

In the data processor shown in the figure, the CPU 300 generates control signals including interruption scanning signal (CLRIP) 301 and interruption scanning signal (CLRMS) 302, interruption flag clear signal (CLRIF) 303, execution address acceptance signal (OEVC) 304 and interruption priority re-judgment signal (RESCAN) 305 and sends them to the interruption controller 400 at a certain timing via applicable control signal lines.

FIG. 4 is an output timing chart of the control signals in a conventional data processor of FIG. 3.

Referring to this figure, the operation of the data processor shown in FIG. 3 is described below.

The interruption controller 400 firstly outputs an interruption request signal (INTRQ) 401 to the CPU 300. Upon receipt of the interruption request, the CPU 300 generates the interruption flag clear signal (CLRIF) 303 to clear up the interruption flag (not shown) in the interruption controller 400 corresponding to the received interruption request and outputs such signal to the interruption controller 400.

To receive the execution address of the interruption routine from the interruption controller 400, the CPU 300 generates the applicable control signal (OEVC) 304 to be output to the interruption controller 400. The interruption controller 400 outputs, at the same timing as the input of the control signal OEVC 304, the applicable execution address to the CPU 300 via the internal bus (not shown).

After the interruption controller 400 has its interruption flag cleared or otherwise changes its status, the CPU 300 generates the interruption priority re-judgment signal (RESCAN) 305 to be output to the interruption controller 400.

Finally, the CPU 300 generates, for output to the interruption controller 400, the interruption scanning signal (CLRIP) 301 upon completion of interruption by a user program and the interruption scanning signal (CLRMS) 302 upon completion of interruption by the microprogram respectively and returns to the ordinary processing.

Thus, the interruption processing is executed.

Considering the recent situation where a higher operation speed is desired in various electronic devices, instruction execution speed in a data processor as described above may be improved by changing its configuration. Instead of the microprogram method controlling the instruction execution by the microprogram, the hard wired method having signal lines for each of the control signals may be adopted for a higher speed. If such a method is adopted, it generates the control signal by, for example, decoding the instruction codes. However, a conventional data processor as above uses many control signals sent from the CPU to the interruption controller as described above. If it adopts the hard wired method, it requires increased hardware to decode all instruction codes, which may result in massive equipment.

In the prior art, there has been a suggestion to eliminate the above drawback in a conventional data processor, which relates to a data processor with reduced control signal lines using the signal level change at the signal lines as the control signals. Such a data processor is, for example, disclosed in the Japanese Unexamined Patent Publication (Kokai) No. Showa 63-126035, "Semiconductor Integrated Circuit Device".

FIG. 5 is a block diagram which shows the configuration of a data processor disclosed in the above laid-open print and FIG. 6 is a timing chart to show the operation at the data processor of FIG. 5. Referring to the figures, the operation of the data processor is described below.

Suppose an interruption request is made from a peripheral circuit I/O to the CPU. Upon generation of an interruption request, the peripheral circuit I/O charges up a control signal line for IRQ/Reverse ACK so that the signal level changes from low to high synchronizing with the clock signal $\phi 2$ among the dual system clock signals $\phi 1$ and $\phi 2$, and sends the signal as the interruption request signal IRQ to the CPU 500.

The CPU 500 fetches the signal level change at the timing of the clock signal $\phi 1$ and judges whether to accept the interruption. If it determines to accept the interruption, synchronizing with the clock signal $\phi 1$, changes the level at the above control signal line IRQ/Reverse ACK from high to low and sends the acknowledge signal to the peripheral circuit I/O.

Thus, by utilizing the signal level change as the interruption request signal and the acknowledge signal, the number of signal lines can be reduced.

However, a conventional data processor as shown in FIG. 5 operates with the two-phase system clock signal. It involves technical problems such as clock skew adjustment and it is difficult to satisfy the need for a higher operation speed.

SUMMARY OF THE INVENTION

It is a first object of the present invention to provide a data processor which can facilitate the adoption of the hard wired method by reducing the number of control signal lines for interruption control while solving the conventional problem above.

It is a second object of the present invention to provide a data processor which can, in addition, easily realize a higher operation speed.

According to one aspect of the invention, a data processor having a CPU and an interruption controller connected with control signal lines, comprising:

interruption request output means for outputting an interruption request to said CPU; and means for detecting changes of level of signal at said control signal lines output from said CPU in response to said interruption request and for executing interruption control processing at rising or falling of the signal level.

In the preferred construction, the CPU and the interruption controller synchronize with the single phase clock signal.

In the preferred construction, the data processor further comprises means for checking for any level change of the signal at the signal lines output from said CPU in response to said interruption request and for sending interruption routine address at the rising or falling timing of said signal level, and means for checking for any level change of the signal at the signal lines output from said CPU in response to said interruption request and for determining priority of registered interruptions at the falling or rising of said signal level after sending of said interruption routine address. Also, the data processor further comprises means for checking for any level change of the signal at the signal lines output from said CPU in response to said interruption request and for clearing interruption flag corresponding to the interruption routine for which the signal is sent at the timing of rising or falling of the signal level.

According to another aspect of the invention, a data processor having a CPU and an interruption controller, comprising:

control signal lines to electrically connect the CPU and the interruption controller synchronizing with the single phase clock signal;

interruption request output means for outputting an interruption request to said CPU; and means for detecting changes of level of signal at said control signal lines output from said CPU in response to said interruption request and for executing interruption control processing at rising or falling of the signal level.

In the above-mentioned construction, the control signal lines comprise a first signal line to send the interruption request signal from said interruption controller to said CPU, a second signal line to send the control signal for instructing interruption processing execution from said CPU to said interruption controller in response to said interruption request, and a third signal line to send the control signal for instructing execution of the processing after completion of interruption from said CPU to said interruption controller, said CPU changing the signal level at said second signal line, and said interruption controller executing the interruption control upon detection of a signal level change at said second signal line.

In the above-mentioned construction, the data processor further comprises means for checking for any level change of the control signal at the second signal line output from said CPU and for sending interruption routine address at the rising or falling timing of said signal level, and means for checking for any level change of the control signal at the second signal line output from said CPU and for determining priority of registered interruptions at the falling or rising timing of said signal level after sending of said interruption routine address, means for checking for any level change of the control signal at the second signal line output from said CPU and for clearing interruption flag corresponding to the interruption routine for which the signal is sent at the timing of rising or falling of the signal level.

According to a further aspect of the invention, a data processing method for interruption control between the CPU and the interruption controller comprising the steps of:

sending an interruption request signal from the interruption controller to the CPU;

detecting changes of level of signal at said control signal lines output from said CPU in response to said interruption request; and executing interruption control processing at rising or falling of the signal level.

In this case, the data processing method further comprises a step for checking for any level change of the control signal at the second signal line output from said CPU and for sending interruption routine address at the rising or falling timing of said signal level, and a step for checking for any level change of the control signal at the second signal line output from said CPU and for determining priority of registered interruptions at the falling or rising timing of said signal level after sending of said interruption routine address, a step for checking for any level change of the control signal at the second signal line output from said CPU and for clearing interruption flag corresponding to the interruption routine for which the signal is sent at the timing of rising or falling of the signal level.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to limit the invention, but are for explanation and understanding only.

In the drawings.

DESCRIPTION OF THE PREFERRED EMBODIMENT

Referring to the attached figures, a preferred embodiment of the present invention is described in detail.

Figure 1:
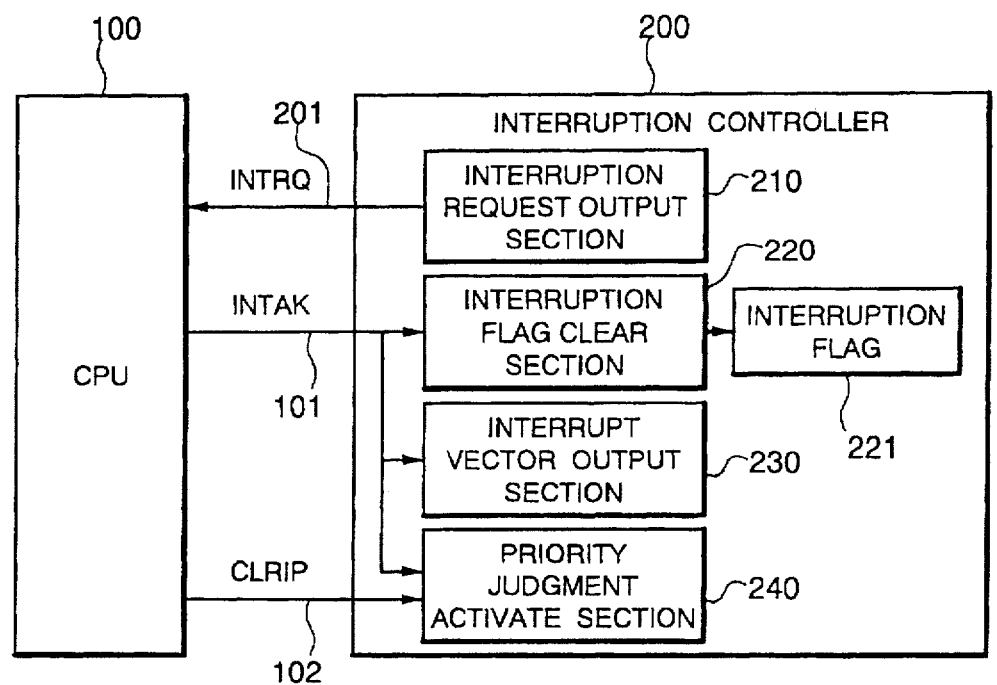
FIG. 1 is a block diagram which shows the configuration of a data processor according to an embodiment of the present invention.

FIG. 1 is a block diagram showing the configuration of a data processor according to an embodiment of the present invention.

As shown in the figure, a data processor of this embodiment has a CPU 100 and an interruption controller 200 connected with three control signal lines.

Among the three control signal lines, the first signal line 31 transmits an interruption request signal (INTRQ) 201 from the interruption controller 200 to the CPU 100, the second signal line 32 sends an acknowledge signal (INTAK) 101 from the CPU 100 to the interruption controller 200 and the third signal line 33 sends a scanning signal (CLRIP) 102 from the CPU 100 to the interruption controller 200. The interruption scanning signal here is a control signal to activate, upon completion of the interruption, the re-judgment process for interruption priority at the interruption controller 200. Re-judgment of the interruption priority is executed upon any change of status at the interruption controller 200 including execution of an interruption registered to the interruption controller 200.

The data processor of this embodiment has a configuration according to the hard wired method. Thus, these signal lines connect the CPU 100 and the interruption controller 200 physically and electrically. Note that this figure shows only the characteristic configuration of this embodiment and omits other sections. It is needless to say that the processor actually has busses for data and address transmission between the CPU 100 and the interruption controller 200 and peripheral circuit I/O to connect the interruption controller 200 and various peripheral circuits.

When an interruption request signal is input from the interruption controller 200, the CPU 100 receives the interruption request and outputs the acknowledge signal (INTAK) 101 at a predetermined timing. The acknowledge signal (INTAK) 101 changes the signal level at the second signal line 32 and by that rising or falling of the level, sends acknowledgement to the interruption controller 200.

The interruption controller 200 is provided, as shown in the figure, with an interruption request output section 210 to output the interruption request signal (INTRQ) 201 to the CPU 100, an interruption flag clear section 220 to receive the acknowledge signal (INTAK) 101 from the CPU 100 and execute certain processing, an interrupt vector output section 230 and a priority judgment activate section 240.

The interruption request output section 210 is a functional means to realize a function similar to the interruption request signal output function in a conventional interruption controller 200. It outputs the interruption request signal (INTRQ) 201 to have the CPU 100 execute the interruption at a predetermined timing via the first signal line 31.

The interruption flag clear section 220 clears the interruption flag 221 upon receipt of the acknowledge signal from the CPU 100. In other words, when the CPU 100 changes the signal level at the second signal line 32, the interruption flag clear section 220 detects the rising or falling of the level and clears the interruption flag 221.

The interrupt vector output section 230 outputs an interrupt vector, which is the address of the interruption routine, upon receipt of the acknowledge signal from the CPU 100 via an address bus (not shown). In other words, when the CPU 100 changes the signal level at the second signal line 32, the interrupt vector output section 230 detects the rising or falling of the level and outputs an interrupt vector.

The priority judgment activate section 240 activates, upon receipt of the acknowledge signal from the CPU 100, the priority re-judgment process as a step of the procedure to return to the ordinary processing. Specifically, the priority judgment activate section 240 activates the priority re-judgment process upon any change of status at the interruption controller 200 including clearance of the interruption flag 221. It does not activate the process at the same timing as the interruption flag clear section 220 and the interrupt vector output section 230, but after the activation of the interruption flag clear section 220 and the interrupt vector output section 230 in response to a first change of the signal level at the second signal line 32. Upon a second change of the signal level at the second signal line 32, it detects the falling or rising of the signal level and activates the priority re-judgment process.

The priority judgment activate section 240 also activates the priority re-judgment process when an interruption scanning signal (CLRIP) 202 is input from the CPU 100 via the third signal line 33.

Figure 2:
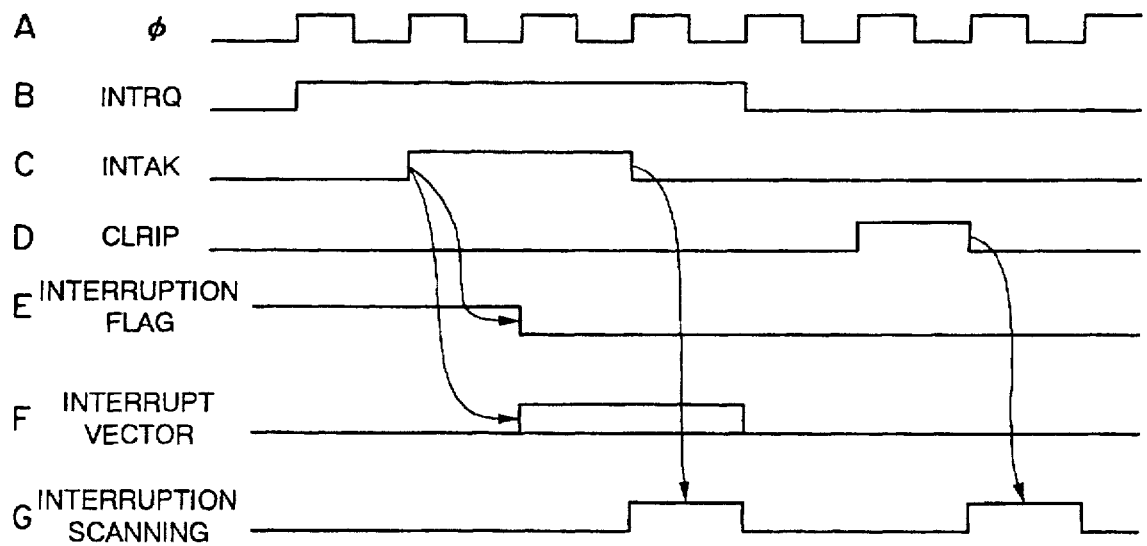
FIG. 2 is a time chart which shows the operation of the above embodiment.
Figure 3:
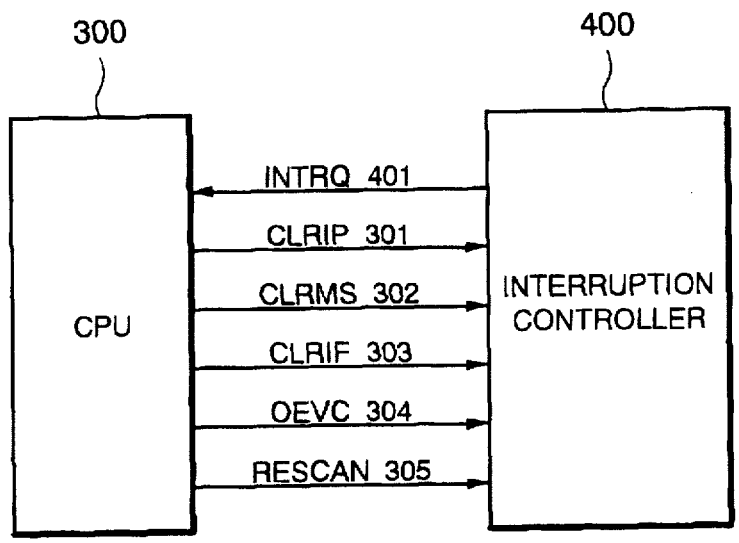
FIG. 3 is a block diagram to show the configuration of a conventional data processor.
Figure 4:
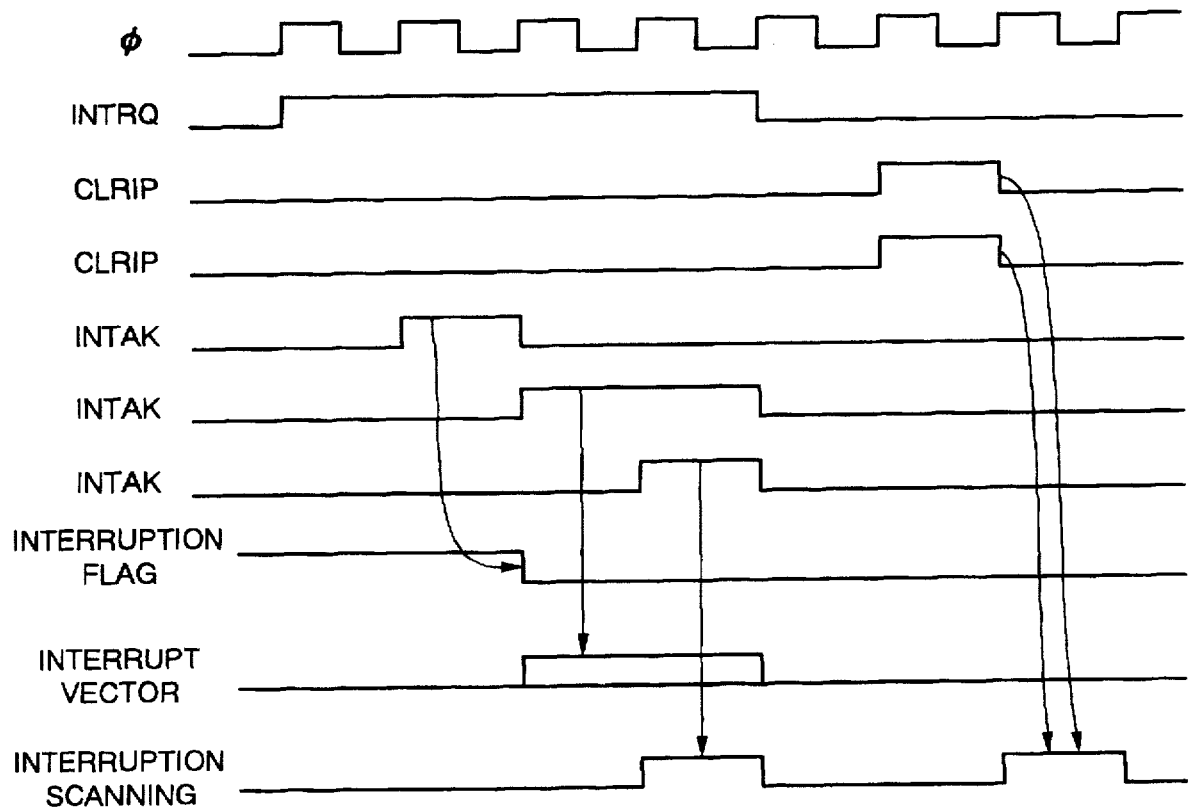
FIG. 4 is a time chart which shows the operation of the data processor shown in FIG. 3.
Figure 5:
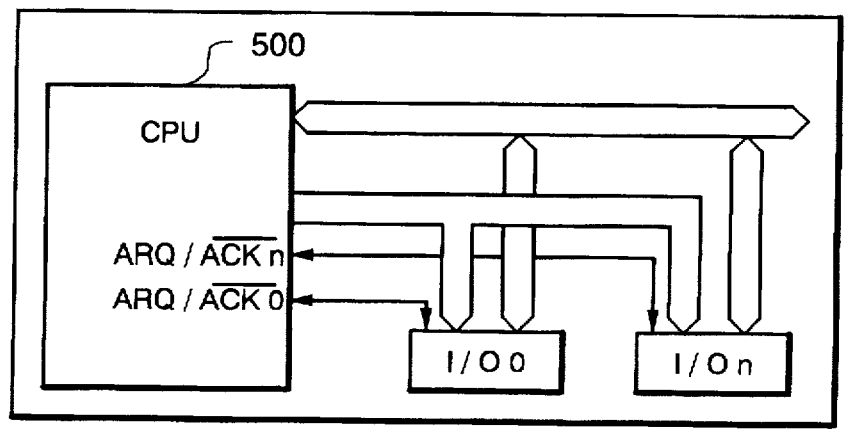
FIG. 5 is a block diagram which shows the configuration of another conventional data processor.
Figure 6:
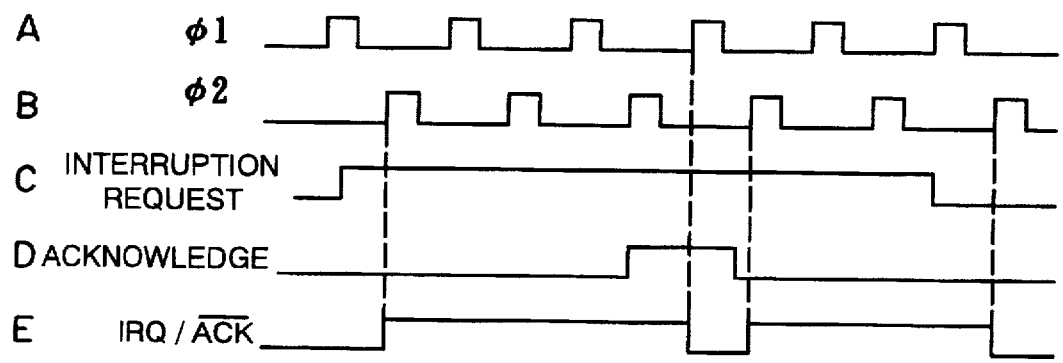
FIG. 6 is a time chart which shows the operation of the data processor shown in FIG. 5.

FIG. 2 is a time chart to show how the control signals are transmitted in a data processor with the configuration as described above. Referring to this figure, the operation of this embodiment is described below.

First of all, the interruption request output section 210 in the interruption controller 200 outputs the interruption request signal (INTRQ) 201 via the first control signal line 31, synchronizing with the clock signal φ. The CPU 100, upon input of the interruption request signal (INTRQ) 201, determines whether to accept the interruption request or not. When it determines to accept the interruption request, it changes, synchronizing with the clock signal φ, the level of the acknowledge signal (INTAK) 101 at the second control signal line 32 from low (initial setting) to high.

The interruption flag clear section 220 of the interruption controller 200 detects the rising of the level for the acknowledge signal (INTAK) 101 and clears the interruption flag 221 synchronizing with the clock signal φ. At the same time, the interrupt vector output section 230 detects the rising of the level for the acknowledge signal (INTAK) 101 and, synchronizing with the clock signal φ, outputs the interrupt vector, which is the address of the applicable interruption routine, via the address bus not shown.

Next, the CPU 100 changes, at a certain timing such as upon acknowledgement of interrupt vector input, the level of the acknowledge signal (INTAK) 101 from high to low synchronizing with the clock signal φ. The priority judgment activate section 240 of the interruption controller 200 detects the falling of the acknowledge signal (INTAK) 101, and activates the priority judgment process (interruption scanning) synchronizing with the clock signal φ.

Upon completion of interruption processing, the CPU 100 outputs the interruption scanning signal (CLRIP) 102 via the third control signal line 33 when the instruction to return from the interruption routine is executed so as to return to the ordinary processing. The priority judgment activate section 240 of the interruption controller 200 detects the falling of the interruption scanning signal (CLRIP) 102 and activates the priority judgment process (interruption scanning) synchronizing with the clock signal φ.

Thus, in a data processor according to the present invention, the number of signal lines are reduced by utilizing level changes at the signal lines as the control signals. In the above embodiment, three control signal lines are sufficient to transmit all control signals. This facilitates adoption of the hard wired configuration, which leads to a higher speed data processor.

Further, a data processor according to the present invention is characterized by the single-phase synchronization signal. It is free from technically difficult problems such as clock skew adjustment, which is observed in a data processor using the two-phase clock signal. This enables a data processor operating at a sufficiently high speed.

Still further, a data processor according to the present invention does not use a dynamic charge-up circuit to change the signal level. This reduces the hardware for charging up, which results in a smaller size and a lower cost.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A data processor comprising:

an interruption control means for setting an interruption flag in response to an interruption request, and for outputting an interruption request signal via an interruption request line; and a central processing unit (CPU) for outputting an interruption acknowledge signal via an interruption acknowledge line in response to said interruption request signal, said interruption acknowledge line being independent of said interruption request line and connected with said interruption request line;

wherein when said interruption acknowledge signal is at an active level, said interruption control means resets said interruption flag and outputs an interruption vector in response to said interruption acknowledge signal, and when said interruption acknowledge signal is at an inactive level, said interruption control means generates an interruption scanning signal to determine interruption priority in response to said interruption acknowledge signal.

2. A processor as set forth in claim 1, wherein said CPU and said interruption control means are synchronized with a single phase clock signal.

3. A data processor as set forth in claim 2, wherein said interruption control means further comprises:

means for checking for any level change of said interruption acknowledge signal at said interruption acknowledge line output from said CPU in response to said interruption request signal and for clearing said interruption flag corresponding to the interruption routine for which the signal is sent at the rising or falling of the signal level.

4. A data processor as set forth in claim 1, wherein said interruption control means further comprises:

means for checking for any level change of said interruption acknowledge signal at said interruption acknowledge line output from said CPU in response to said interruption request signal and for sending said interruption vector to an interruption routine address at the rising or falling timing of said signal level, and means for checking for any level change of said interruption acknowledge signal at said interruption acknowledge line output from said CPU in response to said interruption request signal and for activating said interruption scanning signal to decide interruption priority of registered interruptions at the falling or rising of said signal level after sending of said interruption routine address.

5. A data processor, comprising:

an interruption control means for setting an interruption flag in response to an interruption request, and for outputting an interruption request signal via an interruption request line; and a central processing unit (CPU) for outputting an interruption acknowledge signal via an interruption acknowledge line in response to said interruption request signal, said interruption acknowledge line being independent of said interruption request line and connected with said interruption request line;

control signal lines to electrically connect the CPU and the interruption control means;

wherein when said interruption acknowledge signal is at an active level, said interruption control means resets said interruption flag and outputs an interruption vector in response to said interruption acknowledge signal, and when said interruption acknowledge signal is at an active level, said interruption control means generates an interruption scanning signal to determine interruption priority in response to said interruption acknowledge signal, said CPU and said interruption control means being synchronized with a single phase clock signal.

6. A data processor as set forth in claim 5, further comprising:

an interruption scanning signal line for sending said interruption scanning signal from said CPU to said interruption control means, said CPU changing the signal level at said interruption acknowledge signal at said interruption acknowledge line, and said interruption control means checking for a signal level of said interruption acknowledge signal at said interruption acknowledge line.

7. A data processor as set forth in claim 6, wherein said interruption control means further comprises:

means for checking for any level change of said interruption acknowledge signal at said interruption acknowledge line output from said CPU in response to said interruption request signal and for sending said interruption vector to an interruption routine address at the rising or falling of said signal level, and means for checking for any level change of said interruption acknowledge signal at said interruption acknowledge line output from said CPU in response to said interruption request signal and for activating said interruption scanning signal to decide interruption priority of registered interruptions at the falling or rising of said signal level after sending of said interruption routine address.

8. A data processor as set forth in claim 7, wherein said interruption control means further comprises:

means for checking for any level change of said interruption acknowledge signal at said interruption acknowledge line output from said CPU in response to said interruption request signal and for clearing said interruption flag corresponding to the interruption routine for which the signal is sent at the rising or falling of the signal level.

9. A data processing method for interruption control between a central processing unit (CPU) and an interruption control means comprising the steps of:

setting in said interruption control means an interruption flag in response to an interruption request, and outputting from said interruption control means an interruption request signal via an interruption request line;

outputting from said CPU an interruption acknowledge signal via an interruption acknowledge line in response to said interruption request signal, said interruption acknowledge line being independent of said interruption request line and connected with said interruption request line;

wherein when said interruption acknowledge signal is at an active level, resetting said interruption flag and outputting from said interruption control means an interruption vector in response to said interruption acknowledge signal, and when said interruption acknowledge signal is at an inactive level, generating by said interruption control means an interruption scanning signal to determine interruption priority in response to said interruption acknowledge signal.

10. A data processing method as set forth in claim 9, wherein said CPU and said interruption control means are synchronized with a single phase clock signal.

11. A data processing method as set forth in claim 10, further comprising the steps of:

checking for any level change of said interruption acknowledge signal at said interruption acknowledge line output from said CPU and sending said interruption vector to an interruption routine address at the rising or falling timing of said signal level, and checking for any level change of said interruption acknowledge signal at said interruption acknowledge line output from said CPU and activating said interruption scanning signal to decide interruption priority of registered interruptions at the falling or rising timing of said signal level after sending of said interruption routine address.

12. A data processing method as set forth in claim 11, further comprising:

checking for any level change of said interruption acknowledge signal at said interruption acknowledge line output from said CPU and clearing said interruption flag corresponding to the interruption routine for which the signal is sent at the timing of rising or falling of the signal level.

* * * * *